(12) United States Patent
Reijersen Van Buuren

(10) Patent No.: US 9,107,346 B2
(45) Date of Patent: Aug. 18, 2015

(54) WRAPPING DEVICE

(75) Inventor: Willem Jacobus Reijersen Van Buuren, Dirksland (NL)

(73) Assignee: LELY PATENT N.V., Maassluis (NL)

(*) Notice: Subject to any disclaimer, the term of this patent is extended or adjusted under 35 U.S.C. 154(b) by 833 days.

(21) Appl. No.: 13/303,245

(22) Filed: Nov. 23, 2011

(65) Prior Publication Data

US 2012/0090273 A1 Apr. 19, 2012

Related U.S. Application Data

(63) Continuation-in-part of application No. PCT/NL2010/000068, filed on Apr. 15, 2010, and a continuation-in-part of application No. PCT/NL2010/000075, filed on May 6, 2010.

(30) Foreign Application Priority Data

May 29, 2009 (NL) .................................... 1037000
May 29, 2009 (NL) .................................... 1037003

(51) Int. Cl.
*A01F 15/07* (2006.01)
*B65B 53/00* (2006.01)
(Continued)

(52) U.S. Cl.
CPC ............... *A01F 15/071* (2013.01); *B65B 11/04* (2013.01); *B65B 27/125* (2013.01); *B65B 53/00* (2013.01); *A01F 2015/0735* (2013.01)

(58) Field of Classification Search
CPC ...... B65B 11/04; B65B 11/041; B65B 11/56; A01F 15/07; A01F 15/071
USPC ........... 53/118, 211, 215, 399, 441, 556, 587; 56/341, 342, 343
See application file for complete search history.

(56) References Cited

U.S. PATENT DOCUMENTS 3,722,197 A 3/1973 Vermeer
4,244,166 A * 1/1981 Hayward ........................ 56/341
(Continued)

FOREIGN PATENT DOCUMENTS

DE 4404225 A1 8/1994
EP 774412 A1 5/1997
(Continued)

OTHER PUBLICATIONS

International Search Report of PCT/NL2010/000068 issued Jul. 28, 2010.
(Continued)

*Primary Examiner* — Scott A. Smith
(74) *Attorney, Agent, or Firm* — Hoyng Monegier LLP; Minerva Rivero; David P. Owen

(57) ABSTRACT

The invention relates to a wrapping device to wrap an object in foil material including a frame, a wrapping table mounted on the frame and configured to support the object during wrapping, one or more roll support devices to support one or more rolls of foil material to be rotated about the object during wrapping, a carrying structure mounted on the frame and configured to carry the one or more roll support devices, and a clamping and cutting device to clamp the foil material after wrapping of an object, and to cut the clamped foil material, wherein the clamping and cutting device is mounted on the carrying structure, and wherein the carrying structure is pivotable about a substantially horizontal pivot axis with respect to the frame.

14 Claims, 7 Drawing Sheets

(51) Int. Cl.
*B65B 11/04* (2006.01)
*B65B 27/12* (2006.01)

(56) References Cited

U.S. PATENT DOCUMENTS

| | | | |
|---|---|---|---|
| 5,129,215 A * | 7/1992 | Gratton | 53/587 |
| 5,315,925 A * | 5/1994 | Viaud et al. | 100/88 |
| 5,483,785 A * | 1/1996 | DiCarlo | 53/556 |
| 5,740,662 A | 4/1998 | Royneberg et al. | |
| 5,822,967 A * | 10/1998 | Hood et al. | 56/341 |
| 6,253,532 B1 * | 7/2001 | Orpen | 53/441 |
| 6,341,470 B1 * | 1/2002 | Lacey | 53/176 |
| 6,758,028 B1 * | 7/2004 | Underhill | 53/587 |
| 6,775,956 B1 * | 8/2004 | Lacey | 53/399 |
| 6,901,719 B2 * | 6/2005 | Viaud | 53/118 |
| 7,156,015 B2 * | 1/2007 | McHale et al. | 100/89 |
| 7,166,808 B2 * | 1/2007 | Viaud et al. | 177/1 |
| 8,087,216 B2 * | 1/2012 | Noonan et al. | 53/461 |
| 8,091,326 B2 * | 1/2012 | McHale et al. | 53/588 |
| 8,322,119 B2 * | 12/2012 | Reijersen Van Buuren | 53/587 |
| 8,578,686 B2 * | 11/2013 | Reijersen Van Buuren | 53/587 |

FOREIGN PATENT DOCUMENTS

| | | |
|---|---|---|
| EP | 1285571 A1 | 2/2003 |
| EP | 1502495 A1 | 2/2005 |
| WO | 0036903 A1 | 6/2000 |

OTHER PUBLICATIONS

International Search Report of PCT/NL2010/000075 issued Jul. 22, 2010.

* cited by examiner

WRAPPING DEVICE

CROSS REFERENCE TO RELATED APPLICATIONS

This application is a continuation-in-part of PCT application number PCT/NL2010/000068 filed on 15 Apr. 2010, which claims priority from Netherlands application number 1037003 filed on 29 May 2009, and a continuation-in-part of PCT patent application number PCT/NL2010/000075 filed 6 May 2010, which claims priority from Netherlands application number NL 1037000 filed on 29 May 2009. All aforementioned applications are hereby incorporated by reference in their entireties.

BACKGROUND OF THE INVENTION

1. Field of the Invention

The present invention relates to a wrapping device for wrapping objects in foil material. In particular, the invention relates to a wrapping device for wrapping bales of crop material after a bale has been formed in a baling device. The baling device and wrapping device may be integrated in a single agricultural unit or be provided as two separate agricultural systems.

2. Description of the Related Art

Wrapping devices for wrapping a bale in foil material are for instance disclosed in WO00/36903, EP 1285571, DE4404225 and EP 1 502 495, which documents are each hereby incorporated by reference in their entireties.

An embodiment of a known wrapping device comprises a frame, a wrapping table mounted on the frame and configured to support the object during wrapping, one or more movable roll support devices to support one or more rolls of foil material to be rotated about the object during wrapping, a carrying structure mounted on the frame and configured to carry the one or more roll support devices, and a clamping and cutting device.

The clamping and cutting device is provided to clamp the foil material after wrapping of an object to facilitate the cutting of the foil material, and to cut the clamped foil material, so that the wrapped bale is no longer connected to the rolls of foil material. The clamping and cutting device usually comprises a catch element to catch the foil in order to make the clamping of the foil possible. This catch element may be brought in the trajectory of the foil material during wrapping in order to catch the foil and clamp it at a cutting location. In this cutting location, the foil is cut between the bale and the respective roll of foil material, so that the wrapped bale is no longer connected to the roll of foil material.

The clamped end of the band of foil connected to the roll of foil material is held in the clamping and cutting device after cutting until the wrapping of a new bale is started. When the foil is rotated at least one time about the bale, the clamped end in the clamping and cutting device may be released as the first windings of foil may hold the end of the band of foil.

Such clamping and cutting device must be placed at the end of the wrapping process at least partially in the trajectory to catch the foil, while at the beginning of the process it must be placed outside the trajectory as the one or more roll support devices must be rotated at least once about the bale before the clamped end of the band of foil may be released.

At the same time little space is available in the known wrapping device to place a clamping and cutting device, in particular at a location in which the catch element can easily be moved into and out of the trajectory of the wrapping material during wrapping. As a result, many known clamping and cutting devices of wrapping devices have a complex construction. Multiple movements, rotations and translations, have to be performed to catch and clamp the foil, and multiple hydraulic cylinders are required to perform these actions. Furthermore, the time required performing the catching and clamping is relatively long.

BRIEF SUMMARY OF THE INVENTION

It is an object of the invention to provide a wrapping device having a clamping and cutting device which is compact, reliable, and of relative simple design, or at least to provide an alternative wrapping device.

The invention provides a wrapping device to wrap an object in foil material, the wrapping device comprising:
a frame,
a wrapping table mounted on the frame and configured to support the object during wrapping,
one or more movable roll support devices to support one or more rolls of foil material to be rotated about the object during wrapping,
a carrying structure mounted on the frame and configured to carry the one or more roll support devices, and
a clamping and cutting device to clamp the foil material after wrapping of an object, and to cut the clamped foil material, wherein the clamping and cutting device is mounted on the carrying structure, and that the carrying structure is pivotable about a pivot axis with respect to the frame.

In a wrapping device according to the invention it is possible to move the wrapping and cutting device with respect to an object supported on the wrapping table. This is advantageous as this movement may be used to bring the wrapping and cutting device in or outside the trajectory of the band of foil material which is wrapped about the object. For instance, after wrapping the carrying structure may be moved to a position wherein the clamping and cutting device is at least partially located within the trajectory of the one or more roll support devices during wrapping. Before a new object is wrapped, the carrying structure may be pivoted back to bring the clamping and cutting device outside the trajectory of the one or more roll support devices.

The possible movement of the clamping and cutting device by pivoting of the carrying structure provides more flexibility and space for the location of the clamping and cutting device. As a result, it may be possible to provide a clamping and cutting device having a less complex construction than known clamping and cutting devices.

In an embodiment the carrying structure is pivotable about a substantially horizontal pivot axis.

In an embodiment, the wrapping device is configured to pivot the carrying structure from a wrapping position to a cutting position before cutting of the foil material, whereby in the cutting position a cutting location of the clamping and cutting device is substantially arranged in an imaginary plane defined by the middle of the height of the one or more rolls of foil material during wrapping.

By placing the cutting location of the clamping and cutting device in substantially the same plane as the plane defined by the middle of the rolls of foil material during wrapping, the foil can be cut at a cutting location which is substantially in the middle of the last band of foil wrapped on the object.

As a result, the clamping and cutting device can be arranged relatively close to the object, which is advantageous since a relative short loose end of foil material remains on the object, and more space is available for mounting the clamping and cutting device in the wrapping device.

In an embodiment, the clamping and cutting device comprises a catch element, wherein the catch element is movable between a catch position to catch the foil material and a clamp position in which the foil material can be clamped in order to facilitate cutting of the foil material. The movement of the carrying structure from the wrapping position to the cutting position and the movement of the catch element from the catch position to the clamp position are preferably performed simultaneously.

In an embodiment, the catch element has a curved shape and is linearly guided in a bearing. In such embodiment, the catch element is translatable between a clamp position in which the catch element may clamp the foil and a catch position in which the catch element may catch the foil. In the catch position the catch element must be able to catch the whole height of the band of foil, while in clamp position the foil material can be clamped in order to facilitate cutting of the foil material.

Furthermore, the curved shape of the catch element, for instance the arc of a circle, makes it possible to arrange the catch element in different orientations by translation. For instance, the catch element may be arranged to locate the catch element in the catch position substantially perpendicular, or at least at a relative large angle, for instance 50 degrees to 90 degrees, with respect to the band of foil material, and in the clamp position in a position substantially parallel, or at least at a relative small angle, for instance 0 degrees to 40 degrees, to the band of foil material. This makes a compact design of the clamping and cutting device possible.

This is advantageous as the different possible orientations may be used to bring the catch element in a position for catching the foil and in a position outside the trajectory of the one or more rolls of foil material during wrapping without the requirement of rotation of the catch element, the latter being the case in most prior art clamping and cutting devices.

In an embodiment the catch element comprises a mechanism, such as hook, at an end to take along caught foil material when the catch element is translated from the catch position to the clamp position. The hook may be provided by placing an element which extends at least partially perpendicular to a catch surface of the catch element.

As an alternative or in addition thereto the catch element may be provided with features to improve taking along of the foil during the movement of the catch element from the catch position to the clamp position, such as friction material or little hooks or other extensions on the catch element.

In an embodiment, the bearing is formed by pairs of guiding rollers arranged at opposite sides of the catch element. It has been shown that pairs of guiding rollers, for instance two pairs of guiding rollers at opposite sides of the catch element provide a suitable linear bearing for translating the catch element with respect to a casing or other structure in which the bearing is arranged.

In an embodiment, the catch element is arranged to catch the foil material at a convex side of the catch element.

In an embodiment, the clamping and cutting device comprises a hydraulic cylinder to move the catch element between the catch position and the clamp position, and wherein the hydraulic cylinder is arranged at a concave side of the catch element.

By placing the hydraulic cylinder at the concave side of the guiding element, a relative short cylinder may be used for the displacement of the catch element from the clamp position to the catch position.

In an embodiment, the clamping and cutting device comprises a clamp element which is movable towards the catch element in the clamp position to clamp a foil between the catch element and the clamp element. By providing a separate movable clamp element which is movable towards the catch element in the clamp position, the release of the foil does not require an upward movement of the catch element.

This is advantageous as the release of the foil may be performed during the wrapping of an object. Since no upward movement of the catch element is required, the wrapping and cutting device can be placed closer to the trajectory of the roll support device which makes the wrapping device more compact and the required displacement of the catch element between the catch position and the clamp position smaller.

In an alternative embodiment the clamp element may be fixedly arranged with respect to the bearing and the clamping force may be obtained by the actuator of the catch element.

In an embodiment, the clamping and cutting device comprises a cutting element arranged to cut foil clamped between the catch element and the clamp element, and the clamp element and cutting element are actuable by a clamping and cutting hydraulic cylinder, wherein the clamp element and cutting element are connected to each other with a compressible element to obtain a clamping and subsequent cutting action.

In such embodiment only one actuator, for instance a hydraulic cylinder is required for performing both the clamping and the cutting of the foil. After the catch element is displaced to the clamp position, the foil can be clamped by moving the cutting element towards the catch element. This movement is obtained by actuation of the hydraulic cylinder which is directly connected to the cutting element.

Since the clamp element is connected to the cutting element via the compressible element, for instance a spring, also the clamp element will move towards the catch element. When the clamp element hits the foil, the cutting element will be pushed further by the actuator resulting in compression of the compressible element. The force exerted by the compressible element on the clamp element is used as clamping force to clamp the foil between the catch element and the clamp element.

The invention also provides an agricultural unit comprising:

a baling device comprising bale forming means to form a bale including a pivotable rear flap to open a baling chamber in which the bale can be formed, and a wrapping device according to the invention to wrap the bale formed in the baling device in foil material.

The wrapping device according to the invention is in particular suitable for wrapping bales of crop material after being formed in a baling device. The baling device and the wrapping device preferably have a common frame. The wrapping device may be arranged to wrap a bale at the location of the baling chamber, but is preferably mounted next to the baling chamber such that baling and wrapping of different bales can be performed substantially simultaneously. In an alternative embodiment the wrapping device may have a separate frame.

The invention further provides a method for wrapping an object in foil material, using a wrapping device comprising a frame, a wrapping table mounted on the frame and configured to support the object during wrapping, one or more roll support devices to support one or more rolls of foil material to be rotated about the object during wrapping, a clamping and cutting device to clamp the foil material after wrapping of an object, and to cut the clamped foil material at a cutting location, and a carrying structure pivotably mounted on the frame and configured to carry the one or more roll support devices and the clamping and cutting device, comprising the steps of:

placing an object to be wrapped on the wrapping table;

wrap the object in foil material by rotating the one or more roll supports about the object, while rotating as the same time the object on the wrapping table;

pivoting the carrying structure from a wrapping position to a cutting position before cutting of the foil material, wherein in the cutting position the cutting location of the clamping and cutting device is substantially arranged in an imaginary plane defined by the middle of the height of the one or more rolls of foil material during wrapping, and cutting the foil material.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
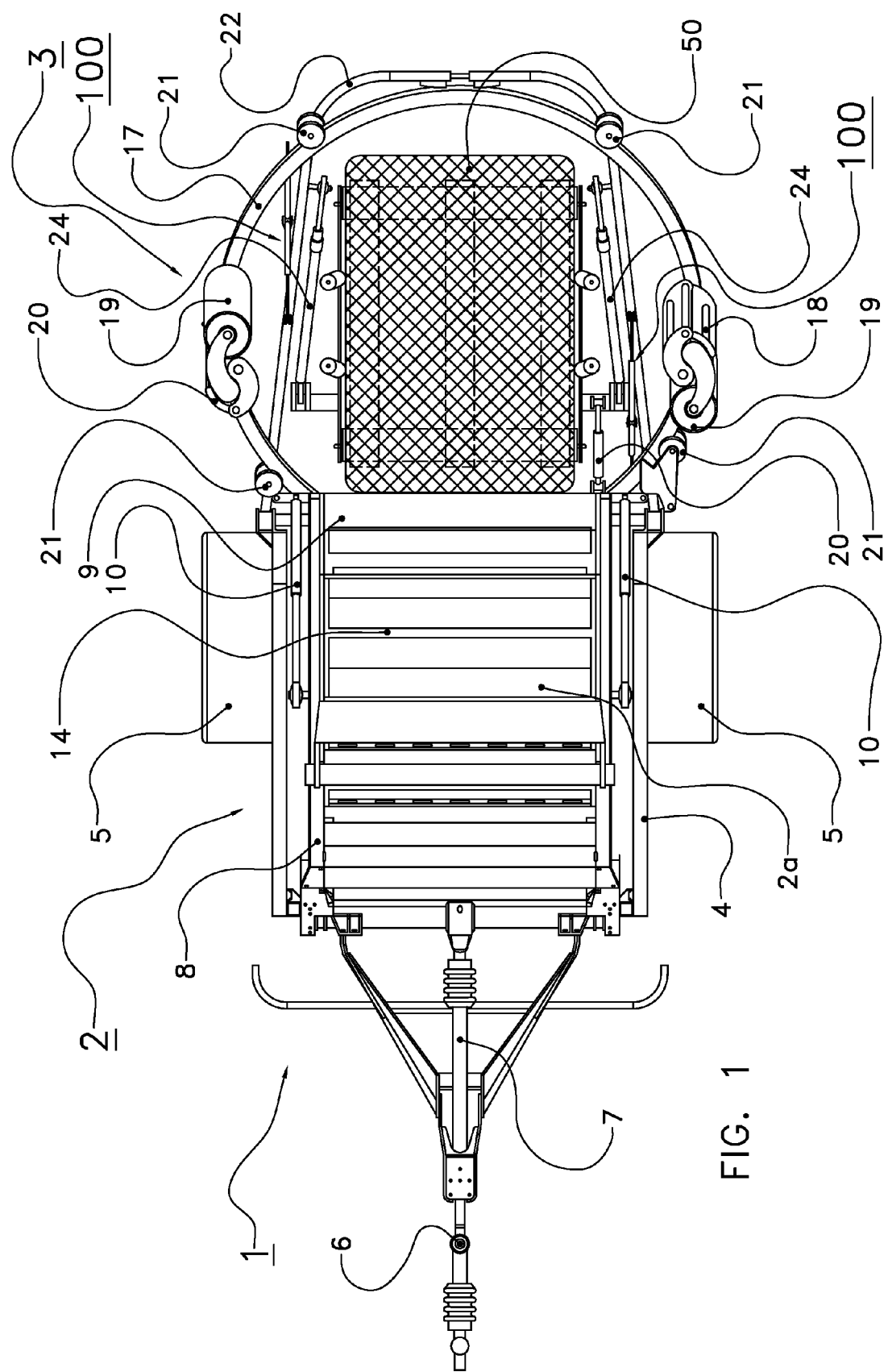
FIG. 1 shows a top view of an agricultural unit according to the invention.
Figure 2:
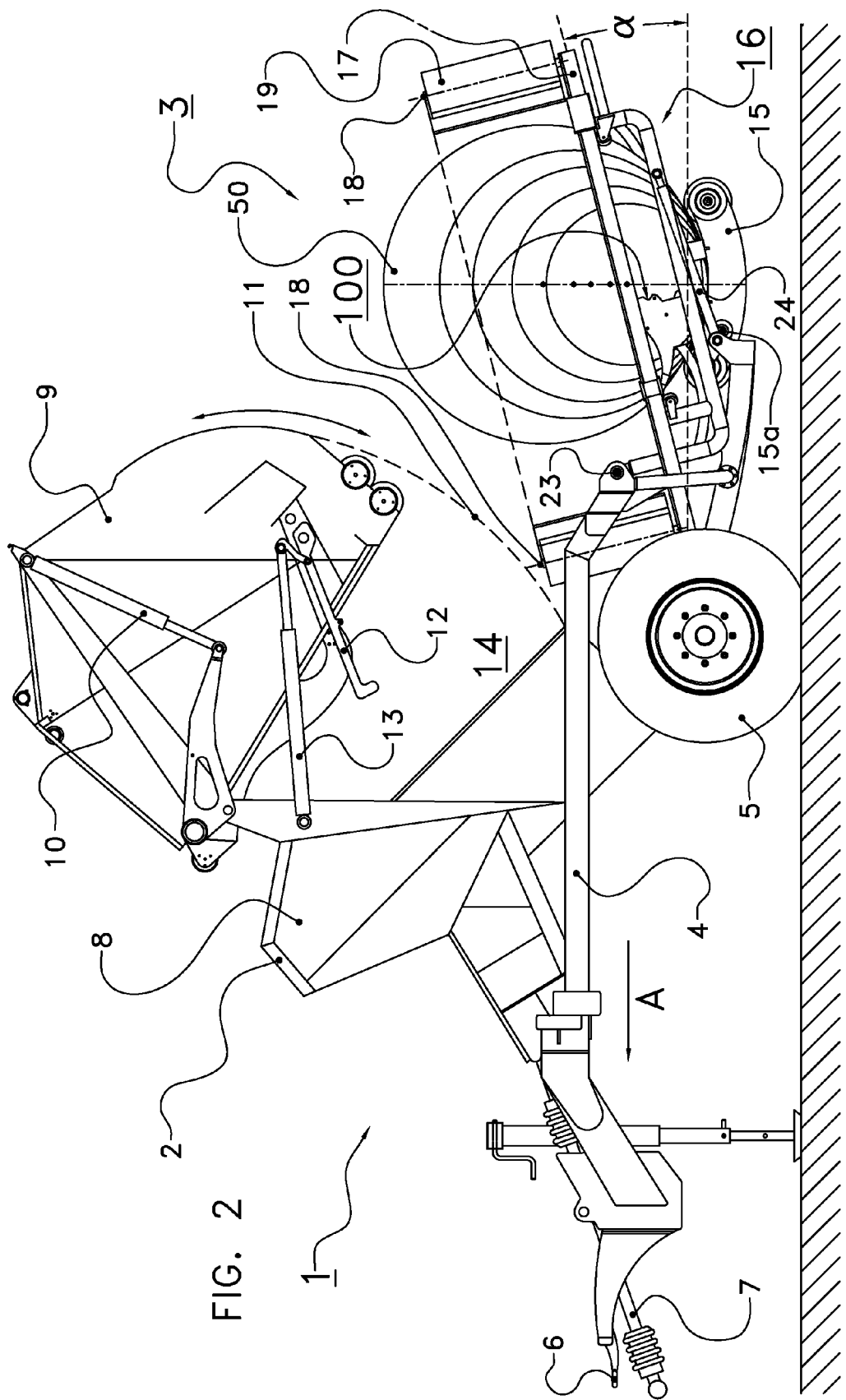
FIG. 2 shows a side view of the agricultural unit of FIG. 1 during wrapping of a bale.

The following is a description of certain embodiments of the invention, given by way of example only and with reference to the drawings. FIG. 1 shows, in top view, an agricultural unit according to the invention which is generally indicated with the reference numeral 1. The agricultural unit 1 comprises a baling device 2 and a wrapping device 3, and is configured to form and wrap bales of crop material. FIG. 2 shows a side view of the agricultural unit 1 of FIG. 1 during wrapping of a bale, as will be described hereinafter.

The baling device 2 and the wrapping device 3 are mounted on a frame 4 which is supported by a pair of wheels 5. The front end 6 of the frame 4 is configured to be connected to a tractor, or other machinery configured to move the agricultural unit in an intended driving direction, indicated by an arrow A. A drive shaft 7 is provided to couple the agricultural unit 1 to a drive mechanism, for instance a drive shaft of a tractor.

The wrapping device 3 is partly located below the baling device 2 to obtain a compact design.

The baling device 2 comprises a stationary part 8 and a pivotable rear flap 9. The pivotable flap is pivotable about a pivot point arranged at the top side of the stationary part 8 and the pivotable rear flap 9. A hydraulic cylinder 10 is provided to pivot the rear flap 9 between an opened and a closed position. During movement of the pivotable flap 9 between the closed and opened position, the pivotable rear flap follows the trajectory 11.

The baling device 2 further comprises a locking arm 12 which is configured to hold the stationary part 8 and the pivotable rear flap 9 together when the pivotable rear flap 9 is in the closed position. A hydraulic cylinder 13 is provided to move the locking arm 12 between a locking position in which the stationary part 8 and the pivotable rear flap 9 are held together, and a non-locking position wherein the pivotable rear flap 9 is not prevented to pivot to its opened position.

The baling device 2 comprises a baling chamber 14 in which the bale 50 may be formed by use of baling means 2a comprising rolls and bands to rotate and press the crop material to form a bale 50. The baling chamber 14 is a variable baling chamber configured to form round bales of crop material of different diameters, for instance 80, 100, 130 and 160 cm in diameter. For further details on an embodiment of a baling device having a variable baling chamber reference is made to U.S. Pat. No. 3,722,197, which is hereby incorporated by reference in its entirety. Other types of baling devices having a variable baling chamber may also be applied. As an alternative the baling chamber 14 may be configured to form bales with constant diameter.

The wrapping device 3 is configured to wrap a bale 50 in wrapping material, typically plastic foil material provided on rolls. The foil material is wrapped about the bale 50 to cover the outer surface of the bale 50.

The wrapping device 3 comprises a wrapping table 15 which supports the bale 50 during wrapping and a wrapping means 16. The wrapping table is configured to rotate the supported bale 50 about its cylindrical axis during wrapping.

The wrapping table 15 is pivotable about pivot axis 15a between different positions. A hydraulic cylinder 20 is provided to pivot the wrapping table 15 between the different positions.

The wrapping table 15 can be placed in a receiving position (not shown) to receive a bale 50 from the baling chamber 14. During wrapping the wrapping table 15 is placed in the wrapping position as shown in FIG. 2.

In the wrapping position the wrapping table is positioned in an angle of 0 degrees with the horizontal plane. In the receiving position the wrapping table 15 is pivoted 20 degrees towards the baling device 2, while in the release position the wrapping table 15 is pivoted 20 degrees away from the baling device 2.

The wrapping means 16 comprises a ring 17 supporting two roll support devices 18 each configured to support a roll of wrapping material 19. The ring 17 is movably supported by a number of rollers 21 mounted on a carrying structure 22. The ring 17 is rotatable during wrapping in order to move the rolls of wrapping material 19 about the bale 50 supported on the wrapping table 15. The carrying structure 22 is mounted under the ring 17.

The wrapping means 16 further comprises two clamping and cutting devices 100 to cut the wrapping material between the bale 50 and the rolls of wrapping material after the wrapping of the bale 50 has finished.

The clamping and cutting device 100 will now be described in more detail. FIGS. 3 to 6 show side views of the clamping and cutting device 100 during different stages of use.

Figure 3:
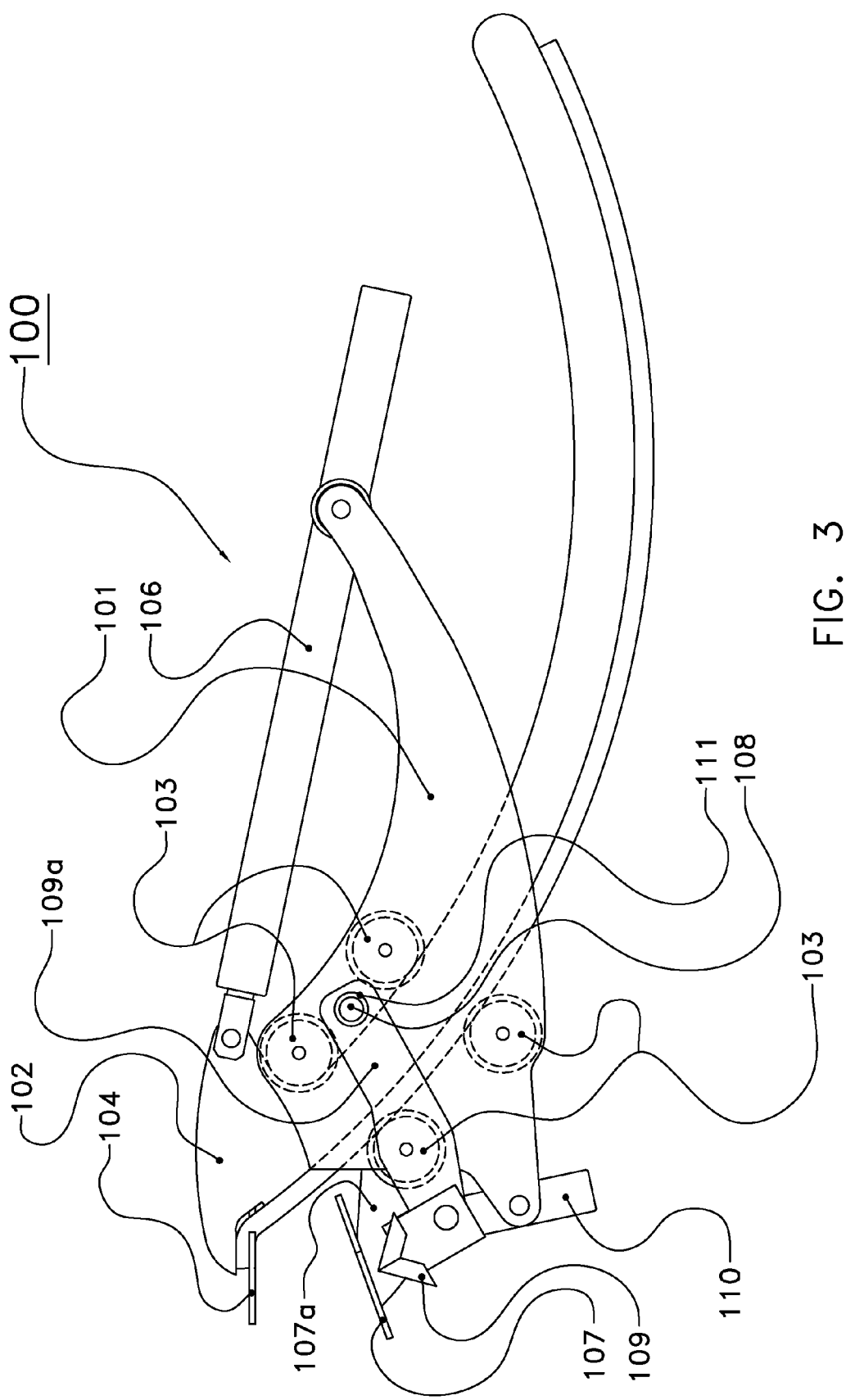
FIG. 3 shows a side view of the clamping and cutting device of the agricultural unit of FIG. 1 during wrapping of an object.

FIG. 3 shows the clamping and cutting device 100 during wrapping of a bale on the wrapping device 3.

Figure 4:
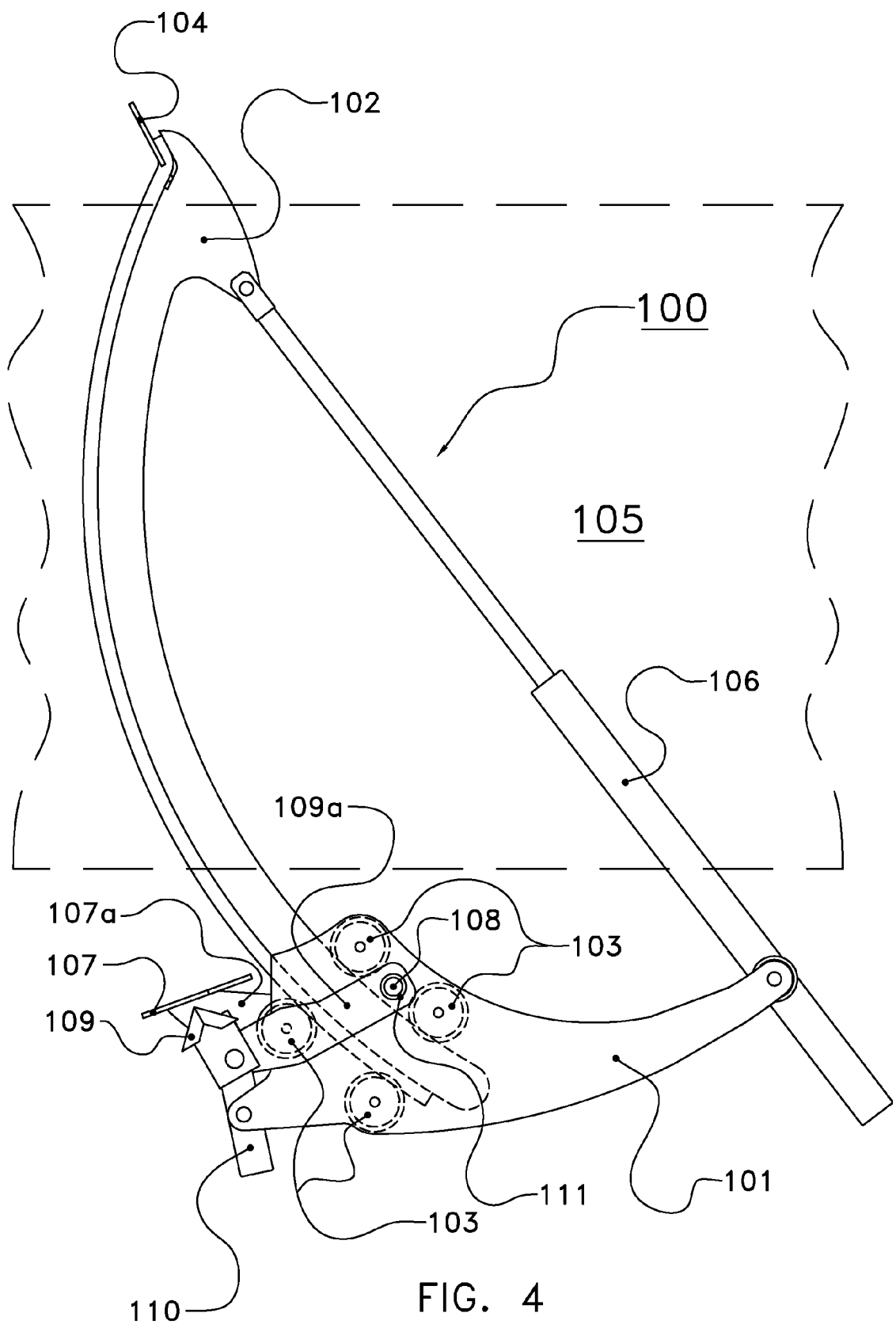
FIG. 4 shows a side view of the clamping and cutting device of the agricultural unit of FIG. 1 with the clamp element in the catch position.

The clamping and cutting device 100 comprises a casing 101 which is mounted on the carrying structure 22 (FIGS. 1, 3 and 7), and a catch element 102 which is movably supported by guiding rollers 103 in the casing 101. The catch element 102 comprises near one end a hook formed by a plate element 104. The catch element 102 is curved having the shape of an arc of a circle, and can be translated between a clamp position (FIG. 3) and a catch position (FIG. 4). In an alternative embodiment the catch element may comprise a curved guiding element.

In the catch position, the catch element 102 is arranged substantially perpendicular, or at least at a large angle, for instance 50 degrees to 90 degrees, with respect to the band of foil material 105 (shown in dashed lines in FIG. 4), which is a desirable orientation for catching the foil. In the clamp position the catch element 102 is arranged substantially parallel, or at least at a small angle, for instance 0 degrees to 40 degrees, with respect to the band of foil which is a desirable position in view of the available space for mounting a clamping and cutting device in the wrapping device 3.

A hydraulic cylinder 106 is provided to translate the catch element 102 between the clamp position and the catch position. The hydraulic cylinder 106 is located at the concave side of the catch element 102, and rotatably connected to the casing 101 and the catch element 102. This is advantageous because the displacement of the piston of the hydraulic cylinder 106 is substantially smaller than the displacement of the catch element 102 from the clamp position to the catch position. Thus a relative small hydraulic cylinder 106 may be used for a large displacement of the catch element 102.

The wrapping and cutting device 100 further comprises a clamp element 107 which is rotatable about a pivot axis 108 from a non clamping position (FIG. 3) to a clamping position (FIG. 5) in which foil 105 catched and gathered by the catch element 102 can be clamped between the catch element 102 and the clamp element 103. The location where the catch element 102 and clamp element 107 clamp the foil 105 is also referred to as cutting location 120.

In an alternative embodiment, the clamp element 103 could be a non-movable element mounted on the casing 101, whereby the foil 105 is clamped by the force exerted by the hydraulic cylinder 106 on the catch element 102. However, the embodiment as shown in FIGS. 3-6 is preferred, because the release of the foil at the start of wrapping of a new bale does not require an upward movement of the catch element 102, but only a downward movement of the clamp element 107.

Since the release of the foil 105 is performed during wrapping, an upward movement of the catch element 102 is undesirable, as it would result in a risk of interference of the catch element 102 in the trajectory of the rolls of foil material 19 and/or a lower location of the wrapping and cutting device 100 with respect to the rolls of foil material 19 resulting in a lower catch position of the catch element 102 and a larger space required for build-in of the wrapping and cutting device 100.

A cutting element 109 is provided to cut the foil clamped between the catch element 102 and the clamp element 107. The cutting element 109 is also rotatably mounted on pivot axis 108 with an arm 109a at the opposite side of the casing 101 with respect to a rotation arm 107a of the clamp element 107. A hydraulic cylinder 110 is provided to move the cutting element 109 towards the catch element 102 in clamp position to cut the foil clamped between the catch element 102 and the clamp element 107.

The clamp element 107 and the cutting element 109 are movably connected to each other by a torsion spring 111. Any other suitable compressible element may also be provided between the clamp element 107 and the cutting element 109, for instance a spring placed directly between the clamp element 107 and the cutting element 109.

Figure 5:
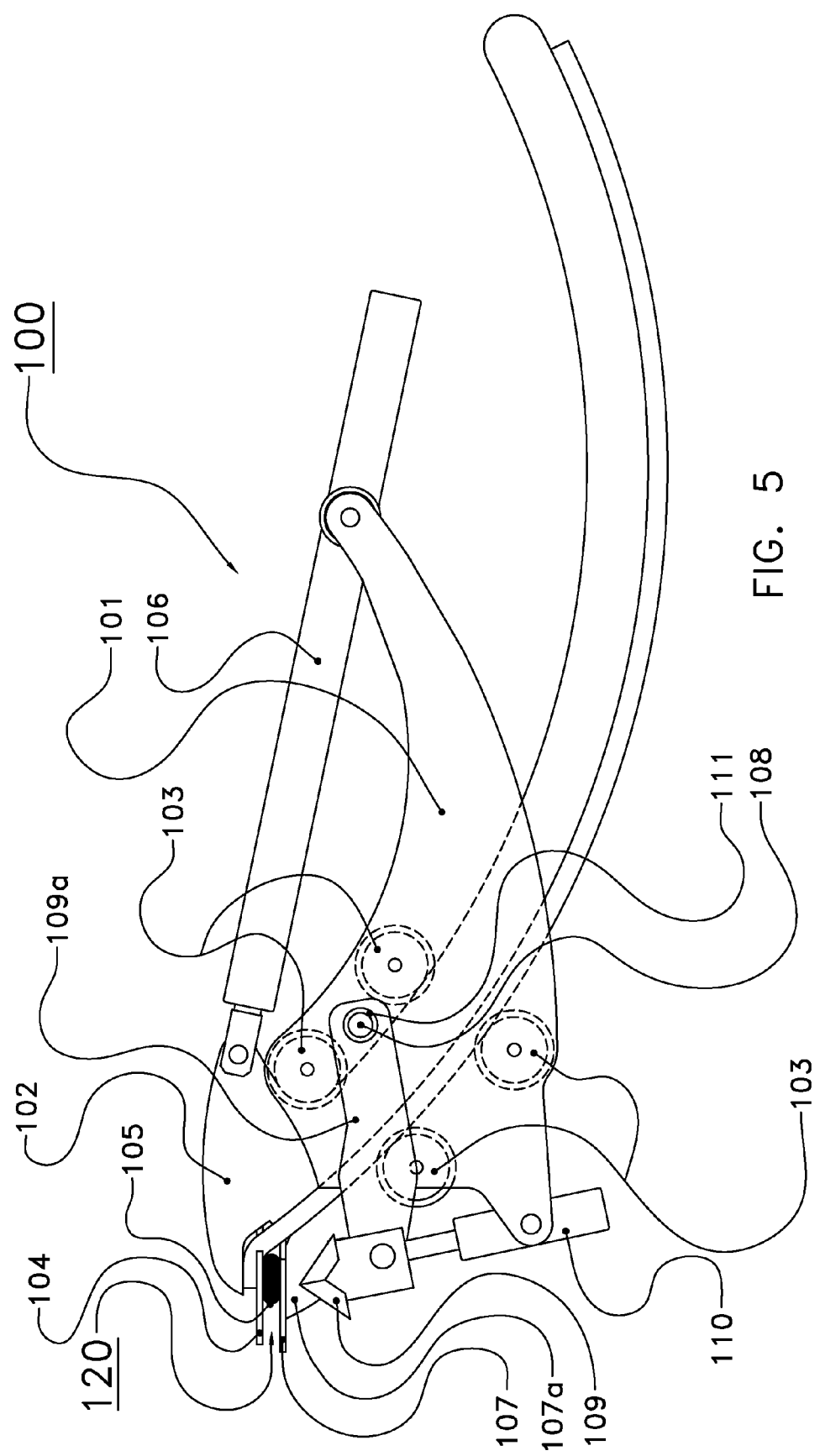
FIG. 5 shows a side view of the clamping and cutting device of the agricultural unit of FIG. 1 with a foil clamped between the catch element and the clamp element.

When the hydraulic cylinder 110 is actuated to move the cutting element 109 towards the cutting location 120, also the clamp element 107 is moved towards this location. When the clamp element 107 reaches the foil 105 gathered by the catch element 102, the clamp element 107 is stopped by the foil 105 and only the cutting element 109 is moved further towards the cutting location 120, while the spring 111 is compressed. The compression of the spring 111 causes a clamping force being exerted by the clamp element 107 on the foil and the catch element 102 with the result that the foil 105 is clamped between the catch element 102 and the clamp element 107, as shown in FIG. 5.

Figure 6:
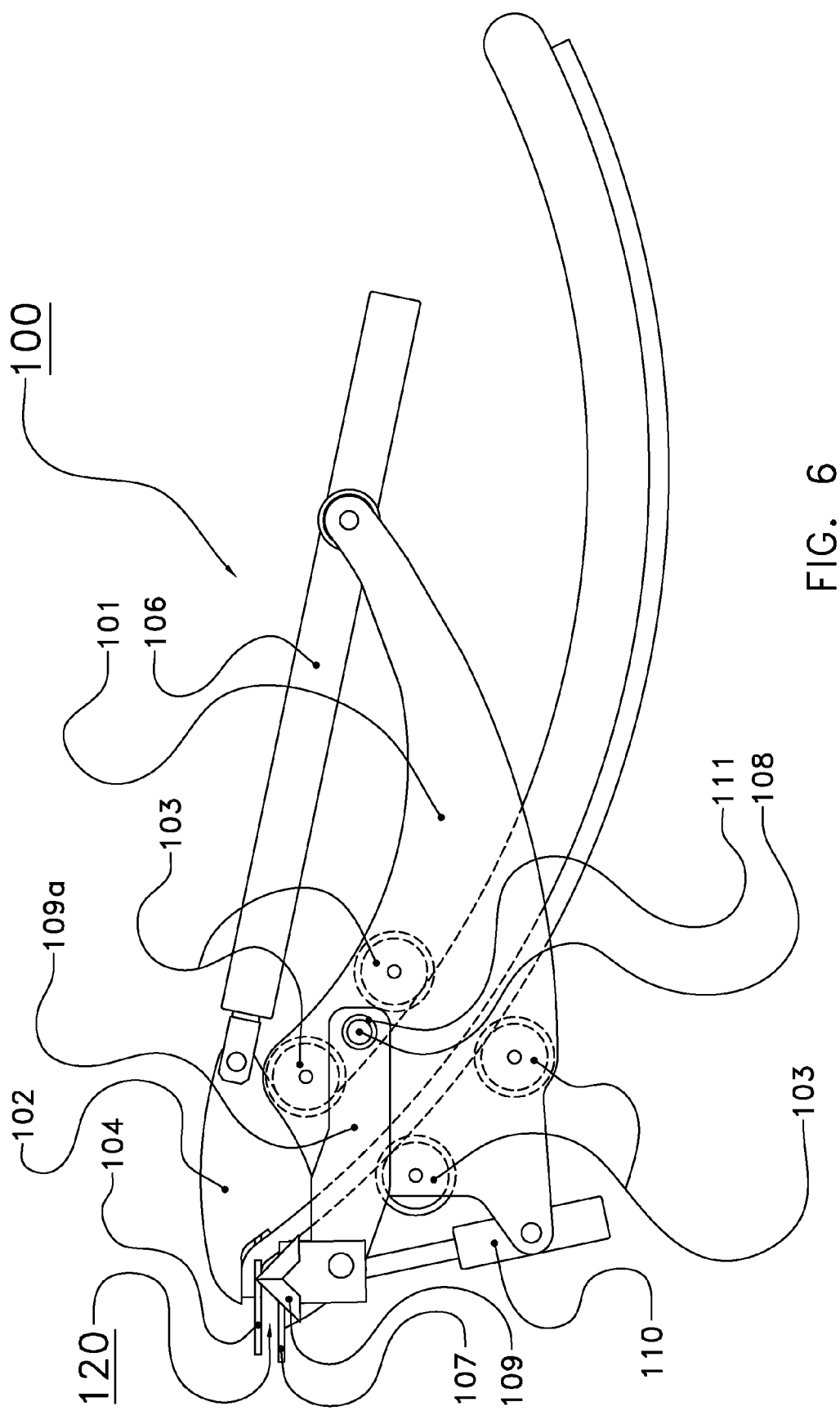
FIG. 6 shows a side view of the clamping and cutting device of the agricultural unit of FIG. 1 just after cutting of a foil.

Further movement of the cutting element 109 by the hydraulic cylinder 110 will move the cutting element 107 to the cutting location 120 as shown in FIG. 6 where the foil is cut. The cutting element 109 is located at the side of the bale 50, so that the end of the foil 105 which is still clamped after cutting is connected to the respective roll of foil material 19, while the wrapped bale 50 is no longer connected to the roll of foil material 19.

Referring again to FIGS. 1 and 2, the wrapping means 16 are arranged at an inclination angle with respect to the horizontal plane, whereby the part below the baling device 2 is the closest to the ground. As a result the trajectory of the moving parts of the wrapping device 3, such as the rotatable ring 17 and roll support devices 18 is also inclined with the angle $\alpha$ with respect to the horizontal plane.

During wrapping the angle $\alpha$ will be in the range 5 to 45 degrees, preferably between 10 to 30 degrees.

The wrapping means 16 can be rotated with respect to the frame 4, since the carrying structure 22 is pivotably mounted on a pivot axis 23 which is arranged parallel to the pivot axis 15a. A hydraulic cylinder 24 is provided to pivot the carrying structure 22 between different positions. The carrying structure 22 is at least pivotable between a wrapping position in which the wrapping means 16 are positioned to wrap a bale 50 supported on the wrapping table 15, as shown in FIG. 2, a release position, wherein a bale 50 can pass through the ring 17 in order to be released from the wrapping device 3, and a transport position, wherein the wrapping means are brought in a position suitable for transport of the agricultural unit.

In the release position and the transport position the angle may be 40 to 90 degrees with respect to a horizontal plane, preferably 50 to 70 degrees.

The top of the trajectory of the wrapping means, in particular of the tops of the roll supporting devices 18 is indicated with a dashed line in FIG. 2. This trajectory of the roll supporting devices 18 during wrapping does not overlap with the trajectory 11 of the rear flap 9 of the baling device 2. As a result, the wrapping process can be started independent of the position of the rear flap 9 of the baling device 2, i.e. wrapping can start before baling. Also, the rear flap 9 can be brought to the closed position in order to start the formation of a new bale 50 independent of the wrapping process.

Now will be described how a bale 50 may be formed and wrapped in an agricultural unit 1 according to the invention.

To form a bale 50 of crop material, the baling device 2 comprises a pick-up device (not shown) for picking crop material from an underground over which the agricultural unit 1 is moved. The crop material is introduced into the baling chamber 14 to form a bale 50 of crop material by pressing and rotating the crop material into a cylindrical form until a bale 50 of the desired diameter is formed.

One of ordinary skill in the art will appreciate that pick up devices are well known in the art. A baler is provided with a rotary driven pick-up that comprises an elongate drum that is oriented transversely to the direction of travel. The drum comprises a large number of so-called tine arms that extend away from the drum and pick-up crop material from the ground as they are driven in rotation. Located downstream of the pick-up is a large rotor that chops the crop material into smaller pieces and takes care of transporting the material towards the bale chamber. Such pick-up devices are known from for example GB2169551 and EP 1273218 both references of which are hereby incorporated by reference in their entireties.

Since considerable forces are used to form the bale 50 in the baling chamber 14, the locking arm 12 is held in the locking position to hold the stationary part 8 and the pivotable rear flap 9 together.

When a bale 50 of a desired diameter has been formed the baling process is stopped and the pivotable rear flap 9 is opened to release the bale 50 from the baling chamber 14. For opening of the baling chamber the locking arm 13 is brought into the unlocked position.

Due to gravity, the bale 50 will roll from the baling chamber 14 towards the wrapping table 15 which is placed in the receiving position to receive the bale 50.

It is remarked that the supporting surface of the wrapping table is located at a lower level than the bottom side of the baling chamber 14 so that the bale 50 can roll from the baling chamber 14 to the wrapping table 15 due to gravity. A guiding ramp or any other transfer means may be provided to guide the bale 50 from the baling chamber 14 to the wrapping table 15.

It may be possible that in certain circumstances, for instance in hilly areas, the gravity force is too small to transfer the bale 50 in a proper way from the baling chamber 14 to the wrapping table 15. In such case, an actuation element may be provided to create or stimulate movement of the bale 50 towards the wrapping table 15. When in contrast the gravity force is too large to transfer the bale 50 in a proper way from the baling chamber 14 to the wrapping table 15, a stop or guiding element to inhibit or decelerate movement of the bale 50 may be provided in order to create a proper transfer of the bale 50 from the baling chamber 14 to the wrapping table 14.

When the bale 50 is supported on the wrapping table 15, the wrapping table may be pivoted to the wrapping position, and the wrapping process may be started.

For wrapping a bale 50 of crop material the bale 50 is supported on the wrapping table 15 while the ring 17 with the roll support devices 18 is rotated about the bale 50 in order to wrap the wrapping material on the bale 50. At the same time, the bale 50 is rotated about its cylindrical axis, so that different parts of the bale 50 are aligned with the rolls of wrapping material in order to wrap the complete surface of the bale 50 in wrapping material.

At the start of the wrapping process the end of the foils are clamped in the respective clamping and cutting devices 100, whereby the clamping and cutting devices 100 are located outside the trajectory of the foil being winded about the bale 50. After the rolls of foil have been rotated at least once about the bale 50 the clamped end may be released by moving the clamp element 107 to a non-clamping position.

By further simultaneous rotation of the rolls of foil material 19 about the bale and rotation of the bale 50 on the wrapping table, the bale is completely wrapped in foil material.

At the end of the wrapping phase the rotation of the roll support devices 18 and the rotation of the bale 50 about its longitudinal axis is stopped In the last rotation of the roll support devices 18 about the bale 50, the catch elements 102 of the two clamping and cutting devices 100 are translated to the catch position to catch the foil between the respective roll with foil material 19 and the bale 50. Then the foil is taken along with the catch element 102 by moving the catch element 102 back to the clamp position.

When the catch element 102 is in the clamp position, the clamping and cutting cylinder 110 may be actuated to subsequently clamp the foil with clamp element 107, and cut the foil with cutting element 109. The location at which the foil is clamped and cut is referred to as cutting location 120.

Figure 7:
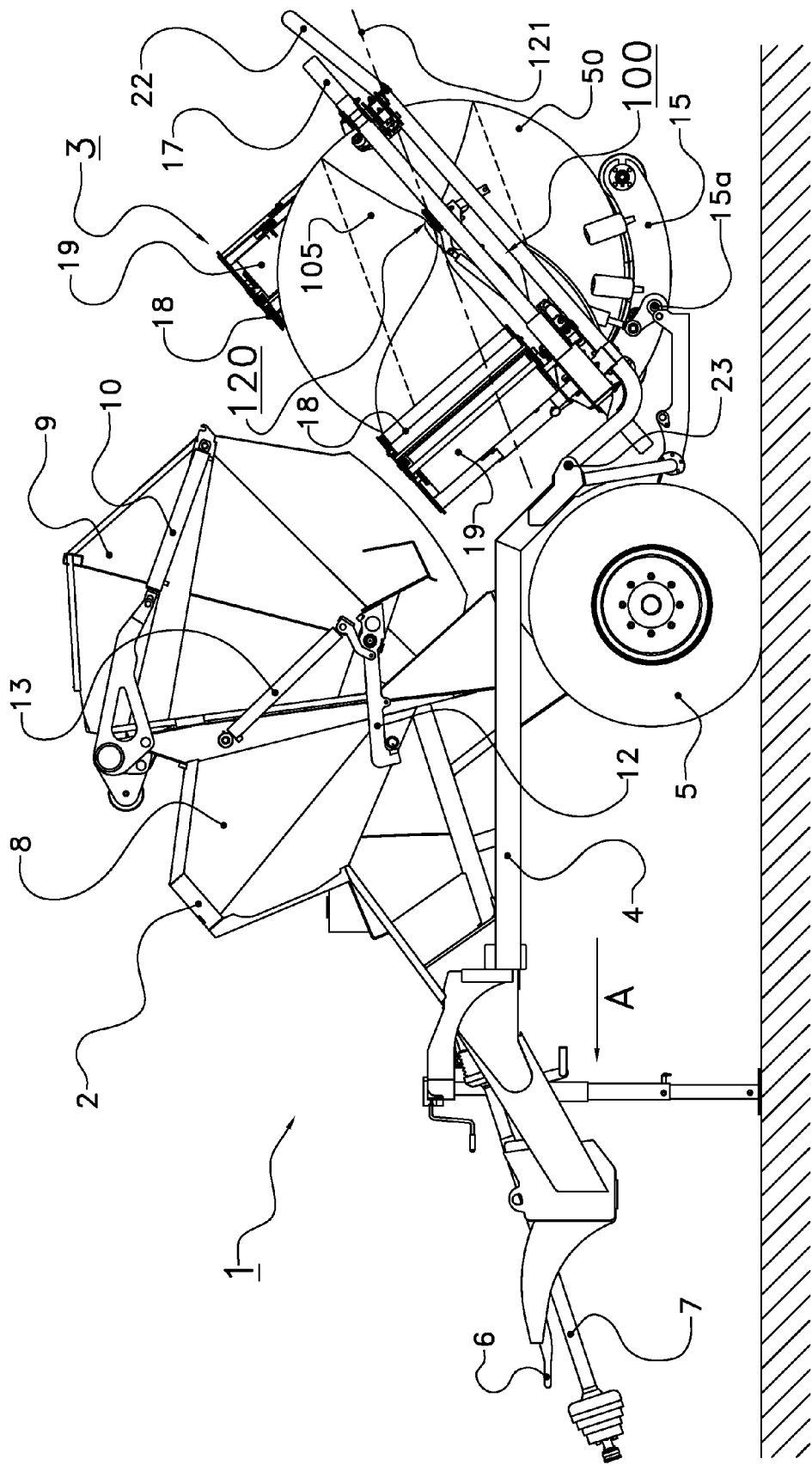
FIG. 7 shows a side view of the agricultural unit of FIG. 1 during cutting of the foil in the clamping and cutting device.

During the translation of the catch element 102 to the clamp position, the carrying structure 22 is pivoted to the position shown in FIG. 7. In this position, the cutting location 120 is situated at substantially the same height as the plane 121 defined by the middle of the roll of foil during wrapping of the bale 50. As a result, the cutting location 120 is in the middle of the band of foil of the last winding on the bale 50. Due to this cutting location 120 the stresses in the foil material are relatively low, and the foil can be cut relative close to the bale 50. This results in a relative low loose end of the foil. Furthermore, the clamping and cutting device 100 can be placed relatively close to the bale 50.

After cutting of the foil, the end of the band of foil connected to the roll of foil material is clamped between the catch element 102 and the clamp element 107. This end of the band of foil remains clamped until the wrapping of a new bale 50 has been started.

The wrapped bale 50 is ready to be released on the ground. To release the bale 50, the wrapping table 15 and the wrapping means 16 may each be pivoted to the release position. In the release position of the wrapping table 15, the bale 50 may roll off the wrapping table to the ground. The bale 50 may go through the ring 17 of the wrapping device 3 as the ring 17 has been pivoted together with the wrapping means 16 to the release position.

Since the carrying structure 22 has already been pivoted to the position shown in FIG. 7, only a short rotation, i.e. pivot movement has to be made to position the wrapping means 16 in the release position. In an embodiment, the position of the carrying structure and wrapping means shown in FIG. 7 is also the release position Hereinabove a wrapping means 16 has been described comprising a rotatable ring 17 and roll support devices 18. In an alternative embodiment the wrapping means may comprise a stationary guiding ring which is configured to guide the roll supporting devices about the bale 50. Any other suitable type of wrapping means may also be applied. Preferably, a wrapping means is used wherein the devices carrying the wrapping material, for instance roll support devices, form the top side of the wrapping device, i.e. the carrying structure of these devices is located below the devices.

Hereinabove, an agricultural unit 1 has been described wherein the baling device 2 and the wrapping device 3 are arranged on a single frame 4. In an alternative embodiment, the wrapping device 3 may be arranged at an independently supported frame which may be coupled to the baling device to form an agricultural system, or may be used independent of the baling device.

The wrapping device 3 as described herein may also be used for any other object to be wrapped in foil material.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A wrapping device to wrap an object in foil material, comprising:
 a frame,
 a wrapping table mounted on the frame and configured to support the object during wrapping, one or more roll support devices to support one or more rolls of foil material to be rotated about the object during wrapping, a carrying structure mounted on the frame and configured to carry the one or more roll support devices, and at least one clamping and cutting device to clamp the foil material after wrapping of an object, and to cut the clamped foil material, wherein the clamping and cutting device is mounted on the carrying structure, wherein the carrying structure is pivotable about a pivot axis with respect to the frame, wherein the clamping and cutting device comprises a catch element, wherein the catch element is movable between a catch position to catch the foil material and a clamp position in which the foil material can be clamped in order to facilitate cutting of the foil material, and wherein the catch element has a curved shape.

2. The wrapping device of claim 1, wherein the carrying structure is pivotable about a substantially horizontal pivot axis.

3. The wrapping device claim 1, wherein the wrapping device is configured to pivot the carrying structure from a wrapping position to a cutting position before cutting of the foil material, wherein in the cutting position a cutting location of the clamping and cutting device is substantially arranged in an imaginary plane defined by the middle of the height of the one or more rolls of foil material during wrapping.

4. The wrapping device of claim 1, wherein the wrapping device is configured to pivot the carrying structure from a wrapping position to a cutting position before cutting of the foil material and wherein movement of the carrying structure from the wrapping position to the cutting position and movement of the catch element from the catch position to the clamp position are performed simultaneously.

5. The wrapping device of claim 1, wherein the catch element is linearly guided in a bearing.

6. The wrapping device claim 5, wherein the bearing is formed by pairs of guiding rollers arranged at opposite sides of the catch element.

7. The wrapping device of claim 1, wherein the catch element in the catch position is arranged at an angle of 50 degrees to 90 degrees with respect to the band of foil material, and in the clamp position at an angle of 0 degrees to 40 degrees with respect to the band of foil material.

8. The wrapping device of claim 1, wherein the catch element comprises a mechanism for taking along foil when the catch element is translated from the catch position to the clamp position.

9. The wrapping device of claim 1, wherein the catch element is arranged to catch the foil material at a convex side of the catch element.

10. The wrapping device of claim 1, wherein the clamping and cutting device comprises a hydraulic cylinder to move the catch element between the catch position and the clamp position, and wherein the hydraulic cylinder is arranged at a concave side of the catch element.

11. The wrapping device of claim 1, wherein the clamping and cutting device comprises a clamp element which is movable towards the catch element in the clamp position to clamp a foil between the catch element and the clamp element.

12. The wrapping device of claim 11, wherein the clamping and cutting device comprises a cutting element arranged to cut foil clamped between the catch element and the clamp element.

13. The wrapping device of claim 12, wherein the clamp element and the cutting element are connected to each other via a compressible element, and wherein the cutting element is connected to a clamping and cutting hydraulic cylinder arranged to move, upon actuation the cutting element towards the catch element in the clamp position to subsequently clamp and cut a foil.

14. An agricultural unit comprising:
a baling device to form a bale, and
a wrapping device to wrap the bale in foil material, the wrapping device comprising:
a frame,
a wrapping table mounted on the frame and configured to support the bale during wrapping,
one or more roll support devices to support one or more rolls of foil material to be rotated about the bale during wrapping,
a carrying structure mounted on the frame and configured to carry the one or more roll support devices, and
at least one clamping and cutting device to clamp the foil material after wrapping of the bale, and to cut the clamped foil material,
wherein the clamping and cutting device is mounted on the carrying structure, and that the carrying structure is pivotable about a pivot axis with respect to the frame,
wherein the clamping and cutting device comprises a catch element, wherein the catch element is movable between a catch position to catch the foil material and a clamp position in which the foil material can be clamped in order to facilitate cutting of the foil material, and
wherein the catch element has a curved shape.

* * * * *